United States Patent
Roy et al.

(10) Patent No.: US 9,812,155 B1
(45) Date of Patent: Nov. 7, 2017

(54) METHOD AND SYSTEM FOR FABRICATING HIGH JUNCTION ANGLE READ SENSORS

(71) Applicant: Western Digital (Fremont), LLC, Fremont, CA (US)

(72) Inventors: Anup Ghosh Roy, Fremont, CA (US); Guanxiong Li, Fremont, CA (US); Daniele Mauri, San Jose, CA (US); Ming Mao, Dublin, CA (US); Goncalo Albuquerque, San Jose, CA (US); Savas Gider, San Jose, CA (US)

(73) Assignee: WESTERN DIGITAL (FREMONT), LLC, Fremont, CA (US)

( * ) Notice: Subject to any disclaimer, the term of this patent is extended or adjusted under 35 U.S.C. 154(b) by 0 days.

(21) Appl. No.: 14/949,155

(22) Filed: Nov. 23, 2015

(51) Int. Cl.
*G11B 5/39* (2006.01)
*G11B 5/127* (2006.01)
*G11B 5/33* (2006.01)

(52) U.S. Cl.
CPC .............. *G11B 5/1272* (2013.01); *G11B 5/33* (2013.01); *G11B 5/3906* (2013.01); *G11B 5/3909* (2013.01); *G11B 5/3912* (2013.01); *G11B 5/3932* (2013.01); *G11B 2005/3996* (2013.01)

(58) Field of Classification Search
CPC ....... G11B 5/3912; G11B 5/33; G11B 5/3906; G11B 5/3932
USPC .................................... 360/319, 324, 324.12
See application file for complete search history.

(56) References Cited

U.S. PATENT DOCUMENTS

| | | | |
|---|---|---|---|
| 5,529,671 | A | 6/1996 | Debley et al. |
| 6,016,290 | A | 1/2000 | Chen et al. |
| 6,018,441 | A | 1/2000 | Wu et al. |
| 6,025,978 | A | 2/2000 | Hoshi et al. |
| 6,025,988 | A | 2/2000 | Yan |
| 6,032,353 | A | 3/2000 | Hiner et al. |
| 6,033,532 | A | 3/2000 | Minami |
| 6,034,851 | A | 3/2000 | Zarouri et al. |
| 6,043,959 | A | 3/2000 | Crue et al. |
| 6,046,885 | A | 4/2000 | Aimonetti et al. |
| 6,049,650 | A | 4/2000 | Jerman et al. |

(Continued)

OTHER PUBLICATIONS

Y.Chen et al., "2Tbit/in2 Reader Design Outlook", IEEE Trans. Magn., vol. 46, No. 3, pp. 697-701, Mar. 2010.

(Continued)

*Primary Examiner* — Jefferson Evans
(74) *Attorney, Agent, or Firm* — Foley & Lardner LLP

(57) ABSTRACT

A method provides a magnetic read apparatus. A sensor stack is deposited. The read sensor is defined from the stack such that the sensor has sides forming a junction angle of 75 degrees-105 degrees from a sensor bottom. Defining the sensor includes performing a first ion mill at a first angle and a first energy and performing a second ion mill at a second angle greater than the first angle and at a second energy less than the first energy. The first angle is 5 degrees-30 degrees from normal to the top surface. After the first ion mill, less than half of the stack's bottom layer depth remains unmilled. Magnetic bias structure(s) adjacent to the sides may be formed. The magnetic bias structure(s) include a side shielding material having at least one of the saturation magnetization greater than 800 emu/cm$^3$ and an exchange length less than five nanometers.

9 Claims, 7 Drawing Sheets

(56) References Cited

U.S. PATENT DOCUMENTS

| | | | |
|---|---|---|---|
| 6,054,023 A | 4/2000 | Chang et al. |
| 6,055,138 A | 4/2000 | Shi |
| 6,058,094 A | 5/2000 | Davis et al. |
| 6,073,338 A | 6/2000 | Liu et al. |
| 6,078,479 A | 6/2000 | Nepela et al. |
| 6,081,499 A | 6/2000 | Berger et al. |
| 6,094,803 A | 8/2000 | Carlson et al. |
| 6,099,362 A | 8/2000 | Viches et al. |
| 6,103,073 A | 8/2000 | Thayamballi |
| 6,108,166 A | 8/2000 | Lederman |
| 6,118,629 A | 9/2000 | Huai et al. |
| 6,118,638 A | 9/2000 | Knapp et al. |
| 6,125,018 A | 9/2000 | Takagishi et al. |
| 6,130,779 A | 10/2000 | Carlson et al. |
| 6,134,089 A | 10/2000 | Barr et al. |
| 6,136,166 A | 10/2000 | Shen et al. |
| 6,137,661 A | 10/2000 | Shi et al. |
| 6,137,662 A | 10/2000 | Huai et al. |
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,395,388 B1 | 5/2002 | Iwasaki et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,334 B1 | 12/2002 | Pang et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,577,470 B1 | 6/2003 | Rumpler |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,633,464 B2 | 10/2003 | Lai et al. |
| 6,636,394 B1 | 10/2003 | Fukagawa et al. |
| 6,639,291 B1 | 10/2003 | Sin et al. |
| 6,650,503 B1 | 11/2003 | Chen et al. |

(56) References Cited

U.S. PATENT DOCUMENTS

| | | |
|---|---|---|
| 6,650,506 B1 | 11/2003 | Risse |
| 6,654,195 B1 | 11/2003 | Frank, Jr. et al. |
| 6,657,816 B1 | 12/2003 | Barr et al. |
| 6,661,621 B1 | 12/2003 | Iitsuka |
| 6,661,625 B1 | 12/2003 | Sin et al. |
| 6,674,610 B1 | 1/2004 | Thomas et al. |
| 6,680,863 B1 | 1/2004 | Shi et al. |
| 6,683,763 B1 | 1/2004 | Hiner et al. |
| 6,687,098 B1 | 2/2004 | Huai |
| 6,687,178 B1 | 2/2004 | Qi et al. |
| 6,687,977 B2 | 2/2004 | Knapp et al. |
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,729,015 B2 | 5/2004 | Matono et al. |
| 6,735,850 B1 | 5/2004 | Gibbons et al. |
| 6,737,281 B1 | 5/2004 | Dang et al. |
| 6,744,608 B1 | 6/2004 | Chen et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Knapp et al. |
| 6,834,010 B1 | 12/2004 | Qi et al. |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,258 B1 | 9/2005 | Li |
| 6,950,266 B1 | 9/2005 | McCaslin et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,987,643 B1 | 1/2006 | Seagle |
| 6,989,962 B1 | 1/2006 | Dong et al. |
| 6,989,972 B1 | 1/2006 | Stoev et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,041,985 B1 | 5/2006 | Wang et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,092,195 B1 | 8/2006 | Liu et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |
| 7,170,725 B1 | 1/2007 | Zhou et al. |
| 7,177,117 B1 | 2/2007 | Jiang et al. |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,211,339 B1 | 5/2007 | Seagle et al. |
| 7,212,384 B1 | 5/2007 | Stoev et al. |
| 7,238,292 B1 | 7/2007 | He et al. |
| 7,239,478 B1 | 7/2007 | Sin et al. |
| 7,248,431 B1 | 7/2007 | Liu et al. |
| 7,248,433 B1 | 7/2007 | Stoev et al. |
| 7,248,449 B1 | 7/2007 | Seagle |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,318,947 B1 | 1/2008 | Park et al. |
| 7,333,295 B1 | 2/2008 | Medina et al. |
| 7,337,530 B1 | 3/2008 | Stoev et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |
| 7,363,697 B1 | 4/2008 | Dunn et al. |
| 7,371,152 B1 | 5/2008 | Newman |
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,386,933 B1 | 6/2008 | Krounbi et al. |
| 7,389,577 B1 | 6/2008 | Shang et al. |
| 7,417,832 B1 | 8/2008 | Erickson et al. |
| 7,419,891 B1 | 9/2008 | Chen et al. |
| 7,428,124 B1 | 9/2008 | Song et al. |
| 7,430,098 B1 | 9/2008 | Song et al. |

(56) References Cited

U.S. PATENT DOCUMENTS

| | | |
|---|---|---|
| 7,436,620 B1 | 10/2008 | Kang et al. |
| 7,436,638 B1 | 10/2008 | Pan |
| 7,440,220 B1 | 10/2008 | Kang et al. |
| 7,443,632 B1 | 10/2008 | Stoev et al. |
| 7,444,740 B1 | 11/2008 | Chung et al. |
| 7,493,688 B1 | 2/2009 | Wang et al. |
| 7,508,627 B1 | 3/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,542,246 B1 | 6/2009 | Song et al. |
| 7,551,406 B1 | 6/2009 | Thomas et al. |
| 7,552,523 B1 | 6/2009 | He et al. |
| 7,554,767 B1 | 6/2009 | Hu et al. |
| 7,583,466 B2 | 9/2009 | Kermiche et al. |
| 7,595,967 B1 | 9/2009 | Moon et al. |
| 7,639,457 B1 | 12/2009 | Chen et al. |
| 7,660,080 B1 | 2/2010 | Liu et al. |
| 7,672,080 B1 | 3/2010 | Tang et al. |
| 7,672,086 B1 | 3/2010 | Jiang |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,785,666 B1 | 8/2010 | Sun et al. |
| 7,796,356 B1 | 9/2010 | Fowler et al. |
| 7,800,858 B1 | 9/2010 | Bajikar et al. |
| 7,819,979 B1 | 10/2010 | Chen et al. |
| 7,829,264 B1 | 11/2010 | Wang et al. |
| 7,846,643 B1 | 12/2010 | Sun et al. |
| 7,855,854 B2 | 12/2010 | Hu et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,968,219 B1 | 6/2011 | Jiang et al. |
| 7,982,989 B1 | 7/2011 | Shi et al. |
| 8,008,912 B1 | 8/2011 | Shang |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,091,210 B1 | 1/2012 | Sasaki et al. |
| 8,097,846 B1 | 1/2012 | Anguelouch et al. |
| 8,104,166 B1 | 1/2012 | Zhang et al. |
| 8,116,043 B2 | 2/2012 | Leng et al. |
| 8,116,171 B1 | 2/2012 | Lee |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,141,235 B1 | 3/2012 | Zhang |
| 8,146,236 B1 | 4/2012 | Luo et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,171,618 B1 | 5/2012 | Wang et al. |
| 8,179,636 B1 | 5/2012 | Bai et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,231,796 B1 | 7/2012 | Li et al. |
| 8,233,248 B1 | 7/2012 | Li et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1 | 1/2013 | Gao et al. |
| 8,349,195 B1 | 1/2013 | Si et al. |
| 8,351,307 B1 | 1/2013 | Wolf et al. |
| 8,357,244 B1 | 1/2013 | Zhao et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |
| 8,385,157 B1 | 2/2013 | Champion et al. |
| 8,385,158 B1 | 2/2013 | Hu et al. |
| 8,393,073 B2 | 3/2013 | Contreras et al. |
| 8,394,280 B1 | 3/2013 | Wan et al. |
| 8,400,731 B1 | 3/2013 | Li et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |
| 8,413,317 B1 | 4/2013 | Wan et al. |

(56) References Cited

U.S. PATENT DOCUMENTS

| | | |
|---|---|---|
| 8,416,540 B1 | 4/2013 | Li et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,437,106 B2 * | 5/2013 | Yanagisawa ............ B82Y 25/00 360/319 |
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,556 B1 | 5/2013 | Wang et al. |
| 8,451,563 B1 | 5/2013 | Zhang et al. |
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,576,517 B1 | 11/2013 | Tran et al. |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 | 1/2014 | Wang et al. |
| 8,637,397 B2 | 1/2014 | Maekawa et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 8,711,518 B1 | 4/2014 | Zeng et al. |
| 8,711,528 B1 | 4/2014 | Xiao et al. |
| 8,717,709 B1 | 5/2014 | Shi et al. |
| 8,720,044 B1 | 5/2014 | Tran et al. |
| 8,721,902 B1 | 5/2014 | Wang et al. |
| 8,724,259 B1 | 5/2014 | Liu et al. |
| 8,749,790 B1 | 6/2014 | Tanner et al. |
| 8,749,920 B1 | 6/2014 | Knutson et al. |
| 8,753,903 B1 | 6/2014 | Tanner et al. |
| 8,760,807 B1 | 6/2014 | Zhang et al. |
| 8,760,818 B1 | 6/2014 | Diao et al. |
| 8,760,819 B1 | 6/2014 | Liu et al. |
| 8,760,822 B1 | 6/2014 | Li et al. |
| 8,760,823 B1 * | 6/2014 | Chen .................... G11B 5/3903 360/319 |
| 8,763,235 B1 | 7/2014 | Wang et al. |
| 8,780,498 B1 | 7/2014 | Jiang et al. |
| 8,780,505 B1 | 7/2014 | Xiao |
| 8,786,983 B1 | 7/2014 | Liu et al. |
| 8,790,524 B1 | 7/2014 | Luo et al. |
| 8,790,527 B1 | 7/2014 | Luo et al. |
| 8,792,208 B1 | 7/2014 | Liu et al. |
| 8,792,312 B1 | 7/2014 | Wang et al. |
| 8,793,866 B1 | 8/2014 | Zhang et al. |
| 8,796,152 B2 | 8/2014 | Mao et al. |
| 8,797,680 B1 | 8/2014 | Luo et al. |
| 8,797,684 B1 | 8/2014 | Tran et al. |
| 8,797,686 B1 | 8/2014 | Bai et al. |
| 8,797,692 B1 | 8/2014 | Guo et al. |
| 8,813,324 B2 | 8/2014 | Emley et al. |
| 8,922,953 B1 * | 12/2014 | Childress .............. G11B 5/3912 360/319 |
| 8,953,284 B1 * | 2/2015 | Mashima et al. .... G11B 5/3948 360/314 |
| 9,076,468 B1 * | 7/2015 | Keener ................ G11B 5/3932 |
| 2009/0290264 A1 * | 11/2009 | Ayukawa ............... B82Y 25/00 360/313 |
| 2010/0053820 A1 * | 3/2010 | Miyauchi ............... B82Y 10/00 360/319 |
| 2010/0290157 A1 | 11/2010 | Zhang et al. |
| 2011/0086240 A1 | 4/2011 | Xiang et al. |
| 2011/0279923 A1 * | 11/2011 | Miyauchi ............... B82Y 10/00 360/75 |
| 2012/0111826 A1 | 5/2012 | Chen et al. |
| 2012/0216378 A1 | 8/2012 | Emley et al. |
| 2012/0237878 A1 | 9/2012 | Zeng et al. |
| 2012/0298621 A1 | 11/2012 | Gao |
| 2013/0216702 A1 | 8/2013 | Kaiser et al. |
| 2013/0216863 A1 | 8/2013 | Li et al. |
| 2013/0257421 A1 | 10/2013 | Shang et al. |
| 2014/0154529 A1 | 6/2014 | Yang et al. |
| 2014/0175050 A1 | 6/2014 | Zhang et al. |
| 2014/0218823 A1 | 8/2014 | McKinlay et al. |
| 2014/0218825 A1 | 8/2014 | Sapozhnikov et al. |
| 2014/0252517 A1 | 9/2014 | Zhang et al. |
| 2014/0252518 A1 | 9/2014 | Zhang et al. |

(56) References Cited

U.S. PATENT DOCUMENTS

2015/0092303 A1* 4/2015 Aoyama .................. G11B 5/11
 360/319
2015/0116867 A1* 4/2015 Childress ............. G11B 5/3906
 360/319
2015/0154991 A1* 6/2015 Le ........................ G11B 5/3906
 360/97.11
2015/0248903 A1* 9/2015 Aoyama ................ G11B 5/398
 360/99.08

OTHER PUBLICATIONS

G. S. Abo et al., "Definition of Magnetic Exchange Length", IEEE Trans. Magn., vol. 49, No. 8, pp. 4937-4939, Aug. 2013.

\* cited by examiner

ABS View

ABS View

ABS View

METHOD AND SYSTEM FOR FABRICATING HIGH JUNCTION ANGLE READ SENSORS

BACKGROUND

FIG. 1 depicts an air-bearing surface (ABS) view of a conventional read apparatus used in magnetic recording technology applications. The conventional read apparatus 10 includes shields 12 and 18, insulator 14, magnetic bias structures 16, and sensor 20. The read sensor 20 is typically a giant magnetoresistive (GMR) sensor or tunneling magnetoresistive (TMR) sensor. The read sensor 20 includes an antiferromagnetic (AFM) layer 22, a pinned layer 24, a nonmagnetic spacer layer 26, and a free layer 28. Also shown is a capping layer 30. In addition, seed layer(s) may be used. The free layer 28 has a magnetization sensitive to an external magnetic field. Thus, the free layer 28 functions as a sensor layer for the magnetoresistive sensor 20. The read sensor 20 typically has its top narrower than its bottom. Thus, the read sensor 20 has junction angle, a. The junction angle is typically fifty degrees, plus or minus fifteen degrees. The lower junction angles are desirable to reduce or prevent damage to the tunneling barrier layer 26 during fabrication and to account for redeposition that occurs during fabrication. The magnetic bias structures 16 are used to magnetically bias the free layer 28.

Although the conventional apparatus 10 functions, there are drawbacks. The trend in magnetic recording is to higher areal density recording. A lower track width (TW) is desired for such higher areal densities. In addition, a reduced shield-to-shield spacing (SS) is desired for higher density recording. However, at smaller track widths, the performance of the read sensor 20 may be adversely affected. For example, the volumes of the AFM layer 22, pinned layer 24 and free layer 28 are reduced at narrow track widths. The free layer 28 reduction in volume is exacerbated by the free layer 28 being narrower than remaining magnetic layers. Thus, the stability of the read sensor 20 and ability of the free layer 28 to function as a sensor layer are impaired. Because a narrow shield-to-shield spacing is also desired and because of the nature of the read sensor 20, the thickness of the layers 22, 24 and 28 may be desired to remain thin.

Accordingly, what is needed is a system and method for improving the performance of a magnetic recording read apparatus, particularly at higher areal densities.

DETAILED DESCRIPTION OF THE PREFERRED EMBODIMENTS

While the various embodiments disclosed are applicable to a variety of data storage devices such as magnetic recording disk drives, solid-state hybrid disk drives, networked storage systems etc., for the sake of illustration the description below will use disk drives as examples.

Figure 1:
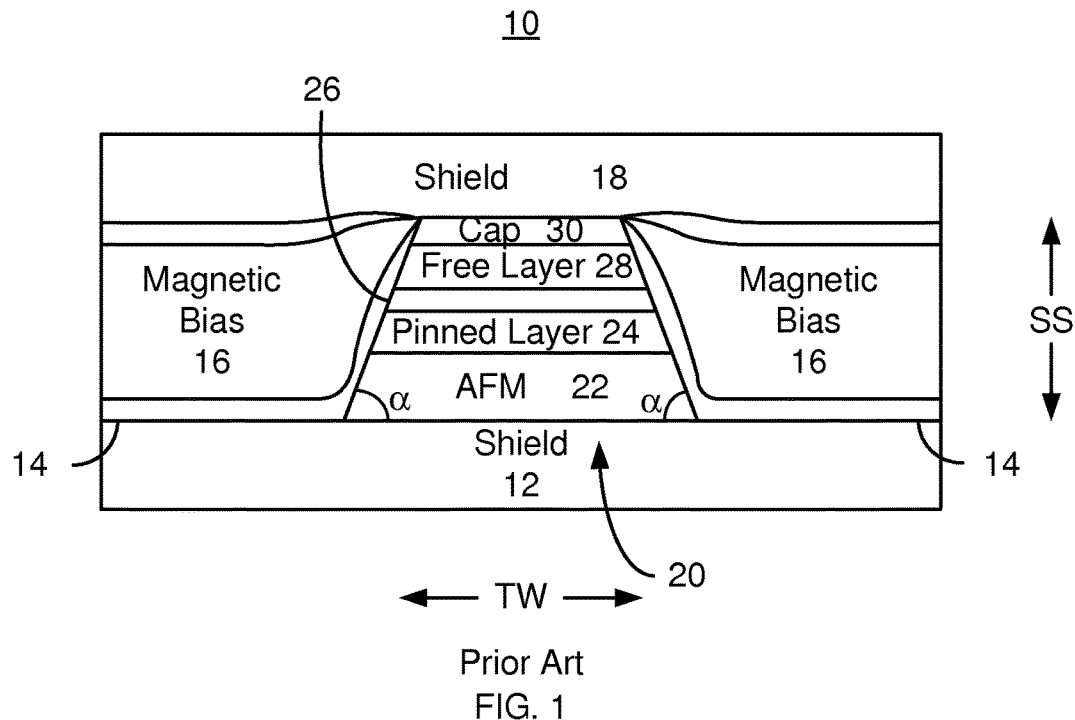
FIG. 1 depicts an ABS view of a conventional magnetic recording read apparatus.
Figure 2:
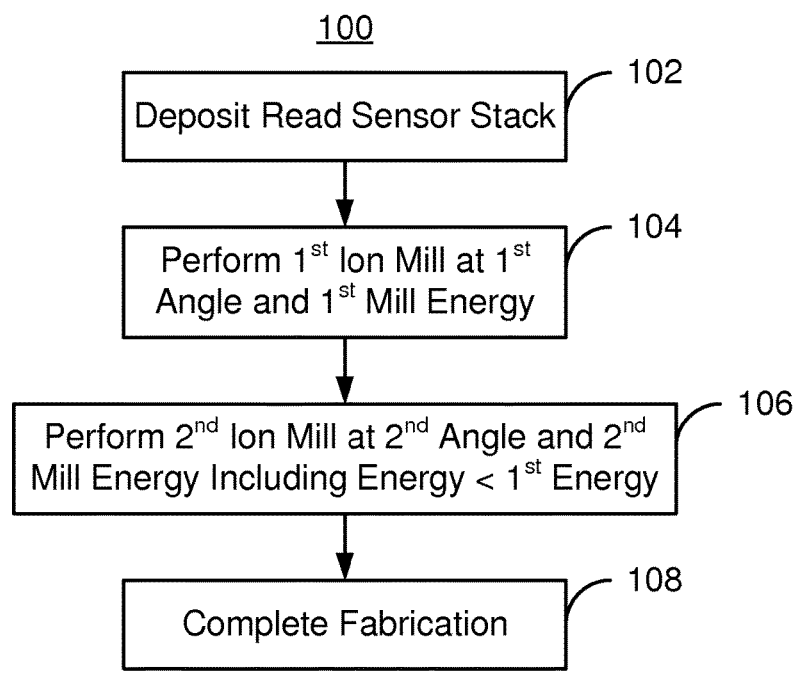
FIG. 2 is a flow chart depicting an exemplary embodiment of a method for fabricating a magnetic read apparatus having read sensor with a high junction angle.

FIG. 2 is an exemplary embodiment of a method 100 for providing a read apparatus. More specifically, the method 100 is used in providing a read sensor. For simplicity, some steps may be omitted, interleaved, combined, have multiple substeps and/or performed in another order unless otherwise specified. Although described in the context of a single magnetic read apparatus, multiple magnetic read apparatuses may be fabricated at substantially the same time. The method 100 may also be used to fabricate other magnetic recording apparatuses. The method 100 is also described in the context of particular layers. A particular layer may include multiple materials and/or multiple sub-layers. The method 100 is described in the context of a disk drive. However, the method may be used in other magnetic storage devices. The method is also described in the context of particular magnetic junctions. In other embodiments, other magnetic junctions may be formed. The method 100 also may start after formation of other portions of the magnetic read apparatus. For example, the method 100 may start after the bottom shield is fabricated.

The layers to form a read sensor stack are deposited, via step 102. The layers deposited in step 102 depend upon the type of read sensor being formed. For example, step 102 may include depositing a reference layer, depositing a nonmagnetic layer on the reference layer and depositing a free layer on the nonmagnetic layer. The nonmagnetic layer may be a tunneling barrier layer or a conductive layer. The reference layer has its magnetic moment fixed, or pinned in a particular direction. In some embodiments, step 102 also includes depositing a pinning layer, such as an antiferromagnetic layer, adjoining the reference layer. Thus, the layers for a magnetic tunneling junction (MTJ) or spin valve may be deposited in step 102. In another embodiment, step 102 may include depositing a first free layer, depositing a nonmagnetic layer on the first free layer and depositing a second free layer on the nonmagnetic layer. Thus, a dual free layer magnetic junction may also be fabricated using the method 100. In other embodiments, other and/or additional layers may be deposited for the magnetic junctions being formed.

The read sensor is then defined using steps 104 and 106. The read sensor could be defined in the track width direction in steps 104 and 106 or in the stripe height direction. The stripe height direction is perpendicular to the ABS. In addition, steps 104 and 106 may define the read sensor such that the read sensor has sides that form junction angles with respect to a bottom of the read sensor. The junction angles are each at least seventy-five degrees and not more than one hundred and five degrees. In some such embodiments, the junction angles may each be at least eighty-five degrees and not more than ninety-five degrees. Junction angles less than ninety degrees may occur for a read sensor having a top smaller than the bottom. Junction angles greater than ninety degrees may occur for a read sensor having a top wider than the bottom. For junction angles described above, the sidewalls need not be straight. For example, for a dual free layer read sensor, the two free layers may be symmetric. In such an embodiment, the middle region of the read sensor may be narrower than the top or the bottom.

A first ion mill on the read sensor stack at a first angle and a first ion mill energy, via step 104. The first angle is at least five degrees and not more than thirty degrees from a normal to the top surface of the read sensor stack. Thus, the first ion mill is performed relatively close to perpendicular to the surface of the read sensor stack. In some embodiments, the first energy at which the ion mill is performed is relatively high. For example, the ion mill may be performed at a milling energy of at least two hundred electron volts. The first ion mill of step 104 mills through most if not all of the read sensor stack. In some embodiments, enough of the read sensor stack is removed that less than half of the depth of a bottom layer of the read sensor stack remains unmilled. In other embodiments, the read sensor stack may be completely milled through. Thus, the bottom layer of the read sensor stack is milled though in such an embodiment.

A second ion mill is performed at a second angle and a second ion mill energy, via step 106. The second ion mill energy is less than the first ion mill energy. In contrast, the second angle for the second ion mill is greater than the first angle for the first ion mill. In some embodiments, the second ion mill energy is at least one-fourth of the first ion mill energy and not more than three-fourths of the first ion mill energy. In some embodiments, the second ion mill energy is nominally half of the first ion mill energy. The second angle may be significantly greater than the first angle. For example, in some embodiments the second angle is at least seventy and not more than eighty five degrees from the normal to the top surface. Thus, the second angle is at a glancing angle from the top of the read sensor layers.

In some embodiments, steps 104 and 106 define the read sensor in the track width direction. Thus, the sides of the read sensor that are formed are the sidewalls as viewed from the ABS. In other embodiments, steps 104 and 106 define the read sensor in the stripe height direction. Thus, the back of the read sensor may be formed in steps 104 and 106. The front/ABS surface of the read sensor is generally formed by lapping. In other embodiments, steps 104 and 106 may define the read sensor in both the stripe height and the track width direction. In such embodiments, steps 104 and 106 might be carried out twice, once for the track width direction and once for the stripe height direction.

An additional ion mill may be performed after step 104 but before step 106 in some embodiments. Such an ion mill may be performed at an energy that is greater than the second energy of step 106, but may use a larger angle than step 104. For example, the energy may be substantially the same as used in step 104 but the angle for such an ion mill may be at least sixty-five degrees and not more than eighty-five degrees from normal to the top surface. In other embodiments, this additional ion milling step may be omitted.

Thus, the read sensor may be defined in the stripe height and/or track width directions by steps 104 and 106. Fabrication of the read apparatus may then be completed, via step 108. For example, side bias structure(s) may be provided. These side bias structure may be magnetic and are used to magnetically bias the free layer(s). In some embodiments, the side bias structures include side shielding material(s). The side shielding material(s) having at least one of a saturation magnetization exceeding 800 emu/cm$^3$ and an exchange length of less than five nanometers. In some cases, a rear magnetic bias structure may also be fabricated. A top shield is also generally provided in step 108. The remainder of the read apparatus, magnetic write apparatus (if any) and data storage device may thus be manufactured.

The method 100 may be used to fabricate a read sensor having substantially vertical sides in the track width and/or stripe height direction. The read sensor may also have a small track width. For example, the track width may be as low as five nanometers or less. Because the sidewalls have large junction angles, the free layer volume may be increased at lower track widths. Thus, the magnetic behavior of the read sensor may be closer to that desired. In addition, steps 104 and 106, particularly step 106 may be used to remove redeposition and/or damaged regions from the sides of the magnetic junction being formed. Because of the lower energy used, this removal can be achieved without causing additional damage to the read sensor. As a result, a read sensor having large junction angles and improved performance may be reliably fabricated.

Figure 3:
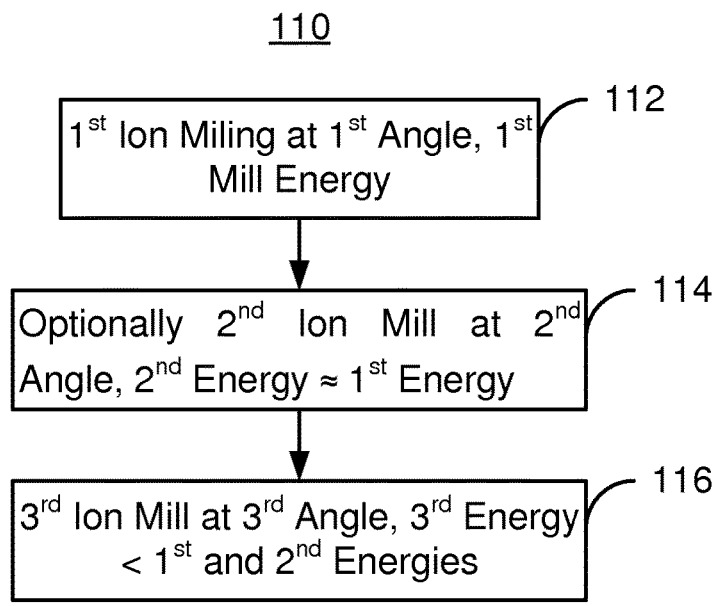
FIG. 3 is a flow chart depicting an exemplary embodiment of a method for fabricating a read sensor with a high junction angle.

FIG. 3 is another exemplary embodiment of a method 110 for defining a read sensor in a magnetic read apparatus. For simplicity, some steps may be omitted, interleaved, combined, have multiple substeps and/or performed in another order unless otherwise specified. FIGS. 4-8 depict an exemplary embodiment of a magnetic read apparatus 200 during fabrication using the method 110. For clarity FIGS. 4-8 are not to scale. FIGS. 4-8 may also be either all ABS location views (views as seen from the plane that will become the ABS) or apex views. If FIGS. 4-8 are considered ABS location views, the method 110 defines the read sensor in the track width direction. If FIGS. 4-8 are considered to be apex views, the read sensor is defined in the stripe height direction using the method 110. Although described in the context of the magnetic read apparatus 200, the method 110 may be used in fabricating other read sensors. Referring to FIGS. 4-8, the method 110 is described in the context of providing a single read apparatus 200 for a magnetic recording disk drive. The method 110 may be used to fabricate multiple magnetic readers at substantially the same time. The method 110 is also described in the context of particular layers. A particular layer may include multiple materials and/or multiple sub-layers. The method 110 also may start after formation of other portions of the magnetic read apparatus. For example, the method 110 may start after the shield and layers for the read sensor stack have been deposited.

Figure 4:
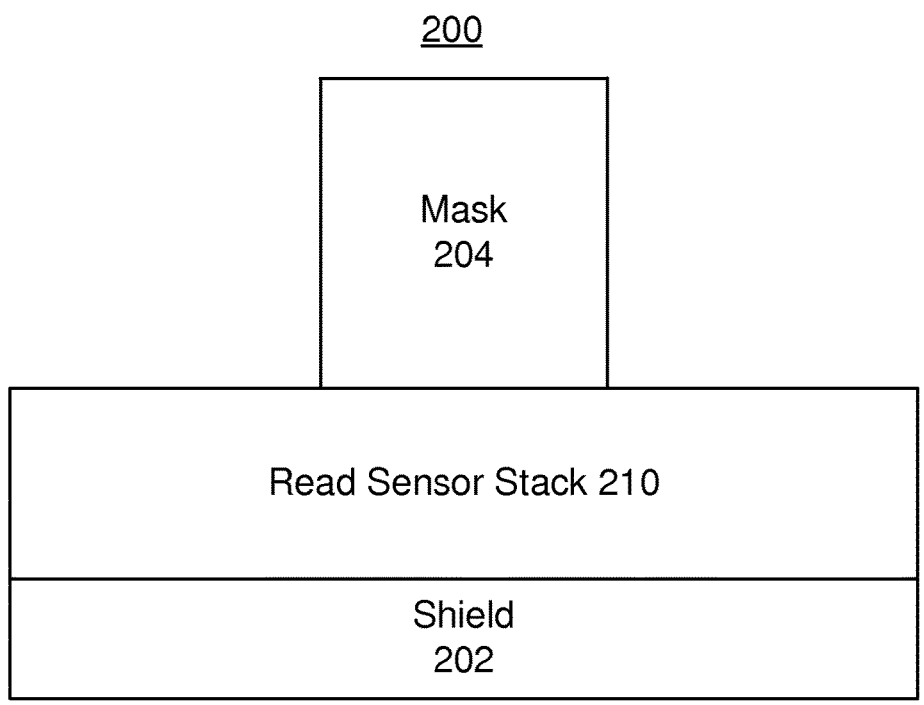
FIGS. 4-8 depict an exemplary embodiment of a portion of a magnetic recording read apparatus during fabrication.
Figure 5:
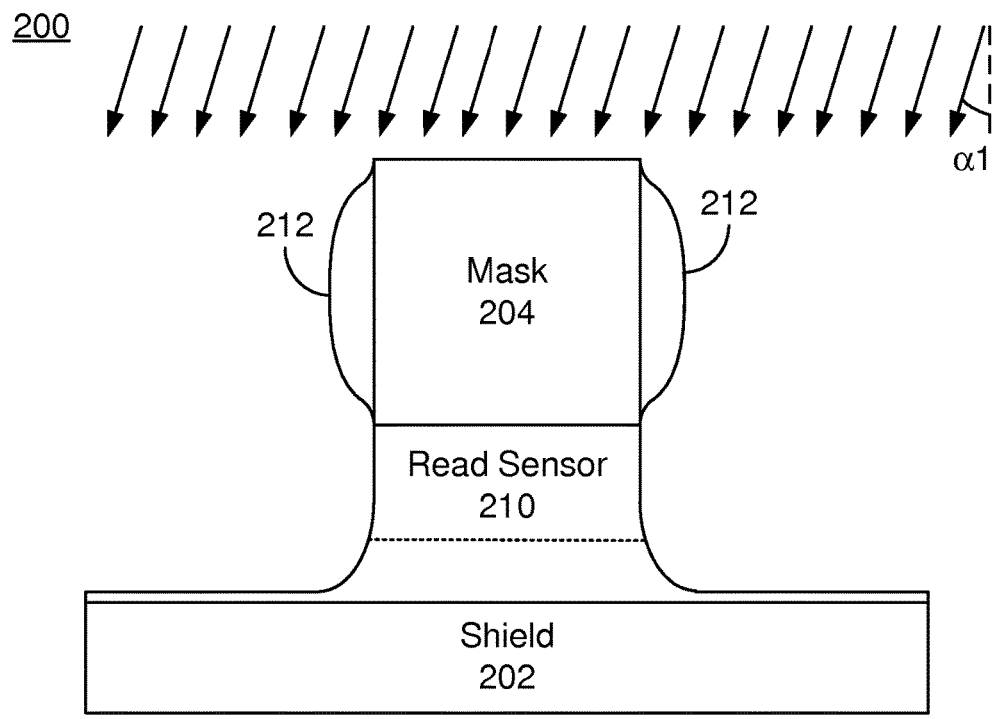

The read sensor stack is milled at a first angle and a first ion mill energy, via step 112. FIG. 4 depicts the read apparatus 200 before step 112 starts. Thus, a shield 202 and read sensor stack 210 is shown. Also depicted is mask 204 used to define the read sensor. The read sensor stack 210 may include multiple layers. For example, the layers for a magnetic tunneling junction, spin valve, dual free layer sensor or other read sensor may be present in the read sensor stack 210. FIG. 5 depicts the read apparatus 200 during step 112. The direction of the ions used in the first ion mill are shown by arrows. The ion mill of step 112 is performed at a first angle, α1. The first angle is at least five degrees and not more than thirty degrees from a normal to the top surface of the read sensor stack. In some embodiments, the first angle is not more than twenty degrees from normal to the surface. In some embodiments, the first ion mill energy at which may be performed at a milling energy of at least two hundred electron volts. In other embodiments, other energies may be used. The first ion mill of step 112 mills through most if not all of the read sensor stack 210. Thus, as can be seen in FIG. 5, the read sensor 210 has been mostly milled through. The dashed line in the read sensor stack 210 of FIG. 5 indicates the top surface of the bottom layer in the read sensor stack 210. Thus, less than half of the depth of the bottom layer of the read sensor stack 210 is unmilled. Although not shown in FIG. 5, the read sensor stack 210 may be completely milled through. Also shown in FIG. 5 is redeposition 212. The redeposition 212 resides at least on the mask 204 used in defining the read sensor.

Figure 6:
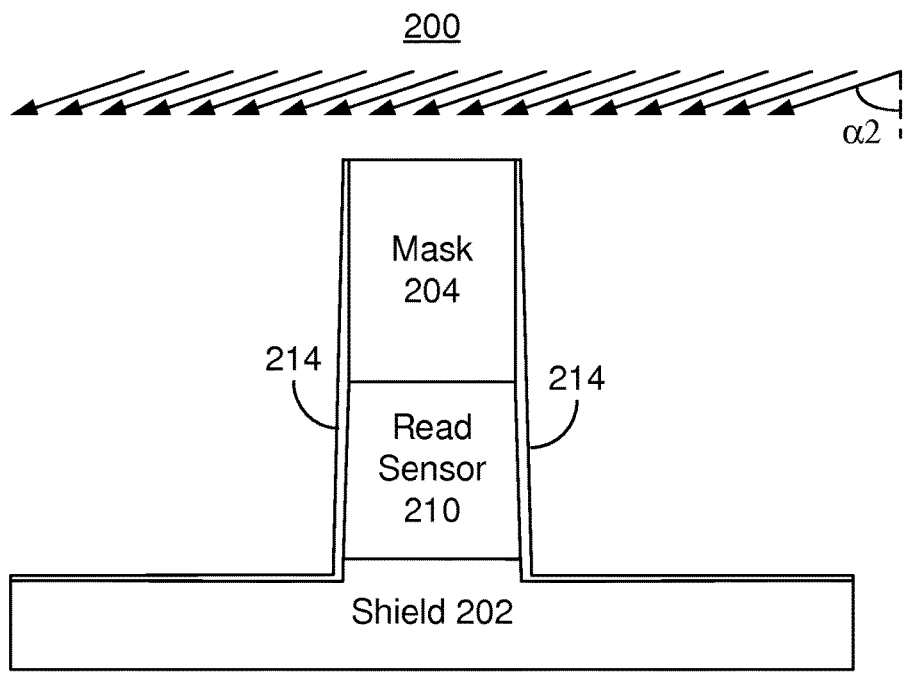

A second, intermediate ion mill is performed, via step 114. Such an ion mill may be performed at an energy that is not more than the first ion mill energy of step 112, but may use a larger angle than step 112. For example, the second ion mill energy may be substantially the same as used in step 112. In other embodiments, the second energy is less than that used in the first ion mill. FIG. 6 depicts the read apparatus 200 during step 114. The direction of the ions used in the second ion mill are shown by arrows. As can be seen in FIG. 6, the second ion mill is performed at a second angle α2 from the normal to the top surface of the read sensor stack 210. The second angle is significantly larger than the first angle. In the embodiment shown, the second angle is at least sixty-five degrees and not more than eighty-five degrees from normal to the top surface. In other embodiments, this second angle may be at least seventy-five degrees. Thus, as can be seen in FIG. 6, the redeposition 212 has been removed. However, a damage/redeposition layer 214 has been formed on the sides of the sensor stack 210.

Figure 7:
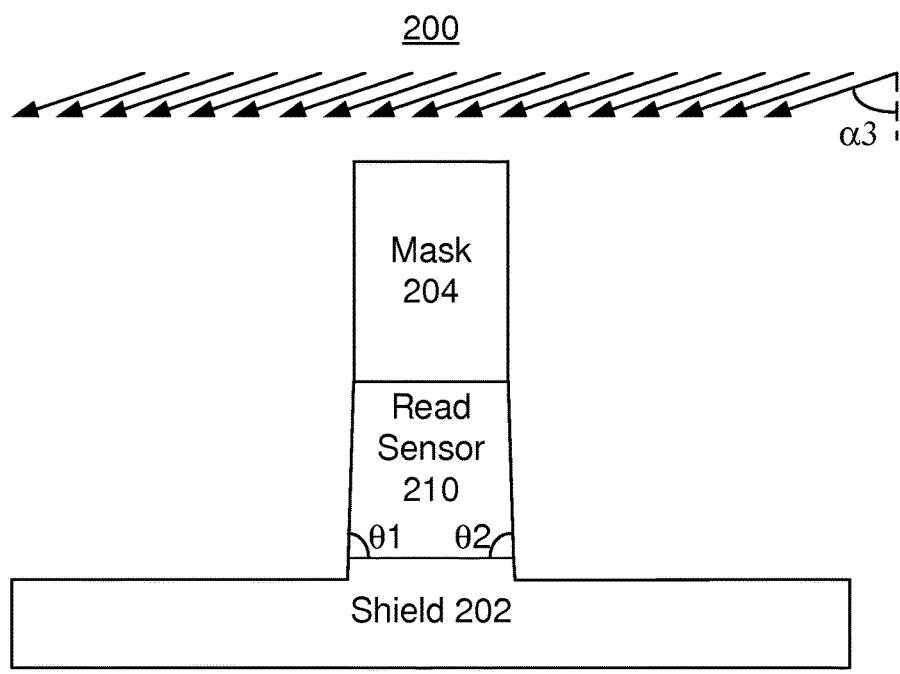

A third ion mill is performed at a third angle and a third ion mill energy, via step 116. The third ion mill energy is less than the first ion mill energy and less than the second ion mill energy. In some embodiments, the third ion mill energy is at least one-fourth of the first ion mill energy and not more than three-fourths of the first ion mill energy. In some embodiments, the third ion mill energy is nominally half of the first ion mill energy. FIG. 7 depicts the read apparatus 200 during step 116. The direction of the ions used in the third ion mill are shown by arrows. Thus, the ion mill is at a third angle, α3. The third angle for this ion mill is greater than the first angle for the first ion mill. In some embodiments the third angle is at least seventy and not more than eighty five degrees from the normal to the top surface of the read sensor stack. Because of the angle and energy used in step 116, the damage layer 214 has been removed. Additional damage due to the third ion mill is minimal or nonexistent because of the low energy and high angle used. Further, the read sensor 210 has been defined. The sides of the read sensor 210 form junction angles θ1 and θ2 with the bottom. In some embodiments, θ1 and θ2 are substantially equal. Further, the junction angles are close to ninety degrees. In some embodiments, the junction angles are each at least seventy-five degrees and not more than one hundred and five degrees. In some such embodiments, the junction angles may each be at least eighty-five degrees and not more than ninety-five degrees.

Figure 8:
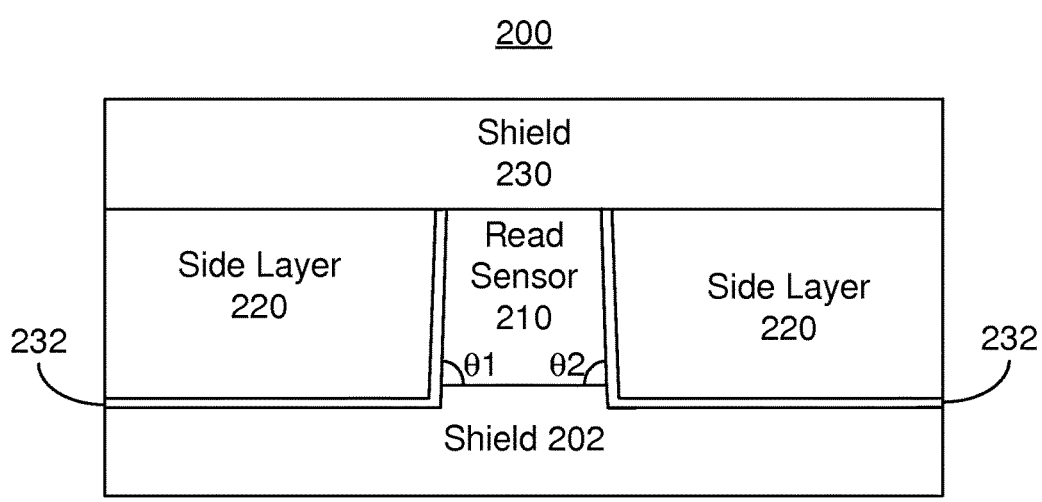

FIG. 8 depicts the read apparatus after conclusion of the method 110. In addition, additional structures are shown. The read apparatus 200 includes the read sensor 210 having junction angles θ1 and θ2, side layers 220, top shield 230 and optional insulating layers 232. Other structures (not shown) such as capping and/or seed layers, additional sensors, and/or leads might be included. If FIG. 8 shows an ABS view, the side layers 220 might be side magnetic bias structures. If FIG. 8 is an apex view (e.g. prior to lapping), then the side layers 220 may be nonmagnetic insulating refill layers and/or rear bias structures.

Thus, the read sensor 210 may be defined in the stripe height and/or track width directions using the method 110. The read sensor 210 has substantially vertical sides in the track width and/or stripe height direction. The read sensor may also have a small track width. For example, the track width may be as low as five nanometers or less. Because the sidewalls have large junction angles, θ1 and θ2, the free layer volume may be increased at lower track widths. Thus, the magnetic behavior of the read sensor 210 may be closer to that desired. In addition, the method 110 removes redeposition and/or damaged regions from the sides of the read sensor 210 being formed. Because of the lower energy used, this can be achieved without causing additional damage to the read sensor 210. As a result, a read sensor 210 having improved performance may be achieved.

Figure 9:
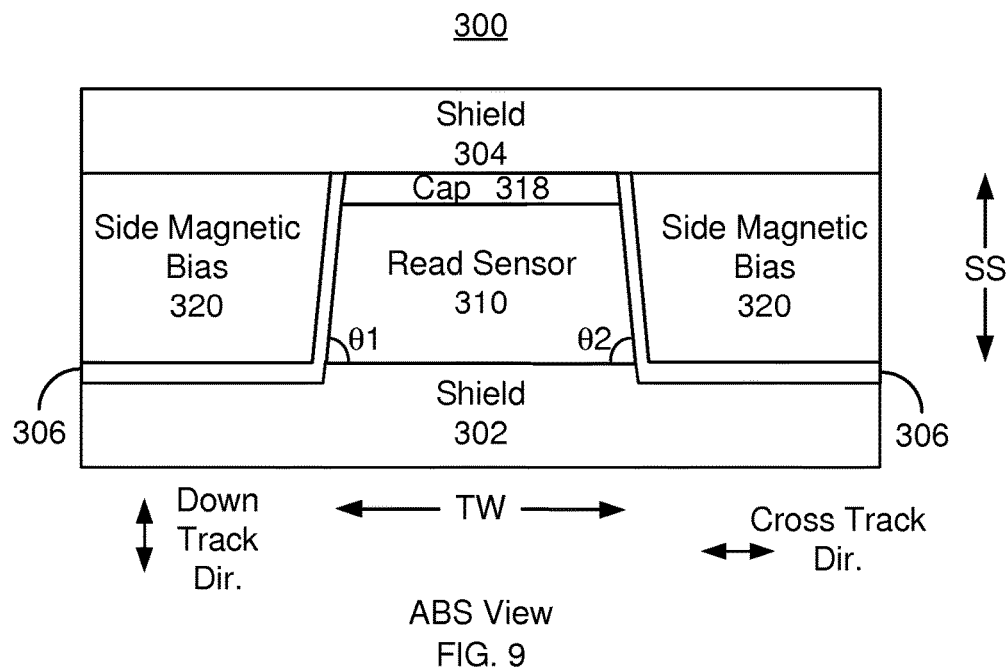
FIG. 9 depicts an ABS view of another exemplary embodiment of a portion of a magnetic recording read apparatus.

FIG. 9 depicts an ABS view of an exemplary embodiment of a portion of a magnetic read apparatus 300. For clarity, FIG. 9 is not to scale. The read apparatus 300 may be part of a read head or may be part of a merged head that also includes a write apparatus. Thus, the read apparatus 300 may be part of a disk drive having a media, a slider and the read apparatus coupled with (fabricated on) the slider. In other embodiments, the read apparatus 300 may be part of another data storage device. Further, only a portion of the components of the read apparatus 300 are depicted. The view shown in FIG. 9 may be for a read apparatus fabricated using the methods 100 and/or 110 in which the ion mills used to define the read sensor are performed at least for the cross-track direction. Thus, the read apparatus 300 may be analogous to the read apparatus 200.

The read apparatus 300 includes shields 302 and 304, read sensor 310, capping layer 318 and soft magnetic bias structures 320. The shield-to-shield spacing is SS, while the track width is TW. The shields 302 and 304 are shown as monolithic shields, which include only a single layer. However, other structures are possible for the shields 302 and 304.

The read sensor 310 may include multiple layers. For example, the layers for a magnetic tunneling junction, spin valve, dual free layer sensor or other read sensor may be present in the read sensor stack 310. The read sensor 310 has a bottom in proximity to (and shown as adjoining) the shield 302, a top in proximity to (and shown as adjoining) the capping layer 318 or shield 304 and sides. The sides form junction angles θ1 and θ2 with the bottom of the read sensor 310. The junction angles are each at least seventy-five degrees and not more than one hundred and five degrees. In some embodiments, the junction angles are each at least eighty-five degrees and not more than ninety-five degrees. In the embodiment depicted in FIG. 9, the junction angles are less than ninety degrees. This configuration results in the top of the read sensor 310 being narrower than the bottom in the cross-track direction. However, larger junction angles are possible. For junction angle(s) of ninety degree, the sides of the read sensor 310 are substantially vertical. Thus, the top of the read sensor 310 may have the same width as the bottom of the read sensor 310. In other embodiments, in which the junction angle(s) are greater than ninety degrees, the top of the read sensor 310 may be wider than the bottom of the read sensor 310 in the cross-track direction. For junction angles described above, the sidewalls need not be straight. For example, for a dual free layer read sensor, the two free layers may be symmetric. In such an embodiment, the middle region of the read sensor may be narrower than the top or the bottom.

Also shown are side magnetic bias structures 320 and nonmagnetic layers 306. The nonmagnetic layers 306 may be insulating if current is driven through the read sensor 310 perpendicular to plane (in the down track direction). The magnetic bias structures 320 include a side shielding material that has a saturation magnetization and an exchange length. In some embodiments, the saturation magnetization of the side shielding material is greater than 800 emu/cm$^3$. In other embodiments, the exchange length of the side shielding material is less than five nanometers. In some embodiments, both the saturation magnetization of the side shielding material is greater than 800 emu/cm$^3$ and the exchange length of the side shielding material is less than five nanometers. This may be achieved by selection of side shielding materials. For example, nanomagnets such as small clusters of Co or Fe particles in an insulating or oxide matrix, such as Hf oxide, may have the reduced exchange length described above. Other materials such as Co, Fe, a CoFe alloy such as $Co_{90}Fe_{10}$ and/or NiFeX, where X is a material such as Cr and/or Ta, may also be used. Other materials having the saturation magnetization and exchange length described above may also be used.

The side magnetic bias structures 320 may consist of only the side shielding material. In some such embodiments, multiple different side shielding materials having the saturation magnetization greater than 800 emu/cm$^3$ and/or the exchange length less than five nanometers may be used. In other embodiments, the side shielding material may be incorporated in another manner. For example, the side magnetic bias structures 320 may include one or more layers of the side shielding material as well as other magnetic or nonmagnetic layers. In such embodiments, the layers of side shielding materials may be ferromagnetically or antiferromagnetically aligned.

The magnetic read apparatus 300 may have improved performance. The large junction angles θ1 and θ2 may allow for improved performance of the read sensor 310. For example, stability and/or other magnetic properties may be improved. Further, the high junction angle read sensor 310 may be reliably fabricated using the method 100 and/or 110. The side magnetic bias structures 320 may also provide improved side shielding. In particular, the combination of the (nearly) vertical sidewalls of the read sensor 310 and the side shielding material discussed above may improve the cross-track resolution. It is noted that the side shielding material described above has a lower exchange length and larger magnetization than is typically selected for side shields. Thus, the improvement in the cross-track resolution for the magnetic read apparatus 300 may be considered surprising.

Figure 10:
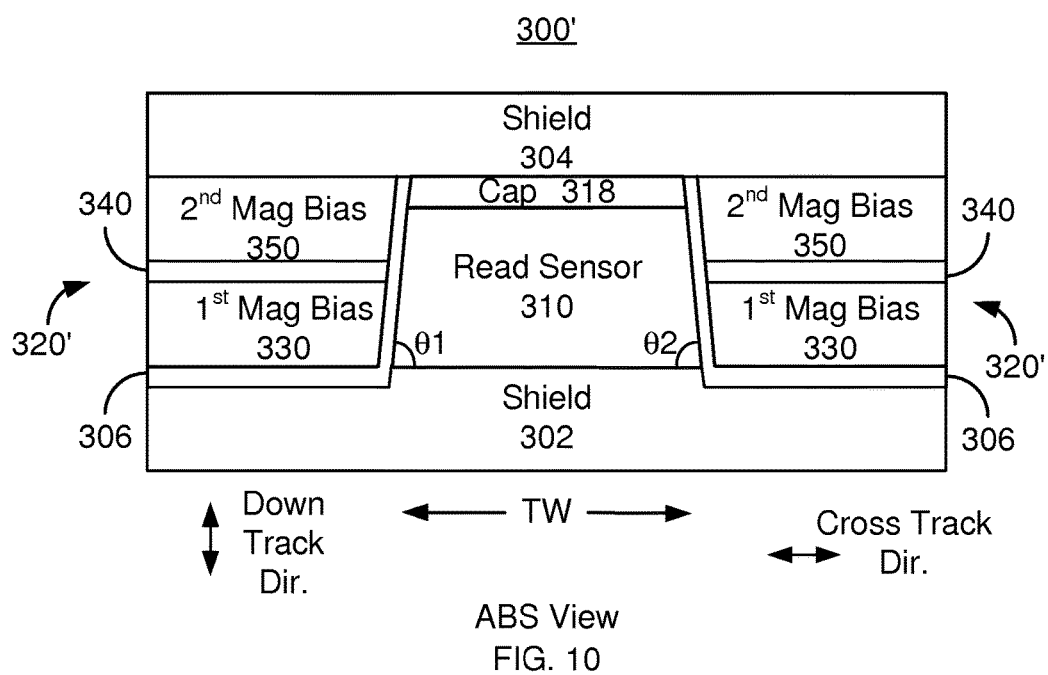
FIG. 10 depicts an ABS view of another exemplary embodiment of a portion of a magnetic recording read apparatus.

FIG. 10 depicts an ABS view of an exemplary embodiment of a read apparatus 300'. For clarity, FIG. 10 is not to scale. The read apparatus 300' may be part of a read head or may be part of a merged head that also includes a write apparatus. Thus, the read apparatus 300' may be part of a disk drive having a media, a slider and the read apparatus coupled with (fabricated on) the slider. In other embodiments, the read apparatus 300' may be part of another data storage device. Further, only a portion of the components of the read apparatus 300' are depicted. The view shown in FIG. 10 may be for a read apparatus fabricated using the methods 100 and/or 110 in which the ion mills used to define the read sensor are performed at least for the cross-track direction. The head of which the read apparatus 300' is a part is part of a disk drive having a media, a slider and the head coupled with the slider. The read apparatus 300' corresponds to the read apparatus 300. Consequently, analogous components are labeled similarly. The read apparatus 300' includes shields 302 and 304, read sensor 310, capping layer 318, nonmagnetic layer 306 and soft magnetic bias structures 320' that are analogous to the shields 302 and 304, read sensor 310, capping layer 318, nonmagnetic layer 306 and soft magnetic bias structures 320, respectively.

The magnetic bias structures 320' include magnetic bias layers 330 and 350 and nonmagnetic layer 340. In some embodiments, the magnetic moments of the magnetic bias layers 330 and 350 are antiferromagnetically aligned. In other embodiments, the magnetic moments of the magnetic bias layers 330 and 350 are ferromagnetically aligned. One or both of the magnetic bias layers 330 and 350 include the side shielding material that has the saturation magnetization greater than 800 emu/cm$^3$ and/or the exchange length less than five nanometers. The side shielding material(s) may be selected from the material(s) described above. In some embodiments, only the magnetic layers 330 are formed of the side shielding material(s). In other embodiments, only the magnetic layers 350 are formed of the side shielding material(s). In still other embodiments both of the magnetic layers 330 and 350 include the side shielding material(s).

The magnetic read apparatus 300' may have improved performance analogous to that of the magnetic read apparatus 200 and/or 300. The large junction angles θ1 and θ2 may allow for improved performance of the read sensor 310. Further, the high junction angle read sensor 310 may be reliably fabricated using the method 100 and/or 110. The side magnetic bias structures 320', particularly in combination with the large junction angle read sensor 310, may also provide improved side shielding. The side shielding material described above has a lower exchange length and larger magnetization than is typically selected for side shields. Thus, the improvement in the cross-track resolution for the magnetic read apparatus 300' may be considered surprising.

Figure 11:
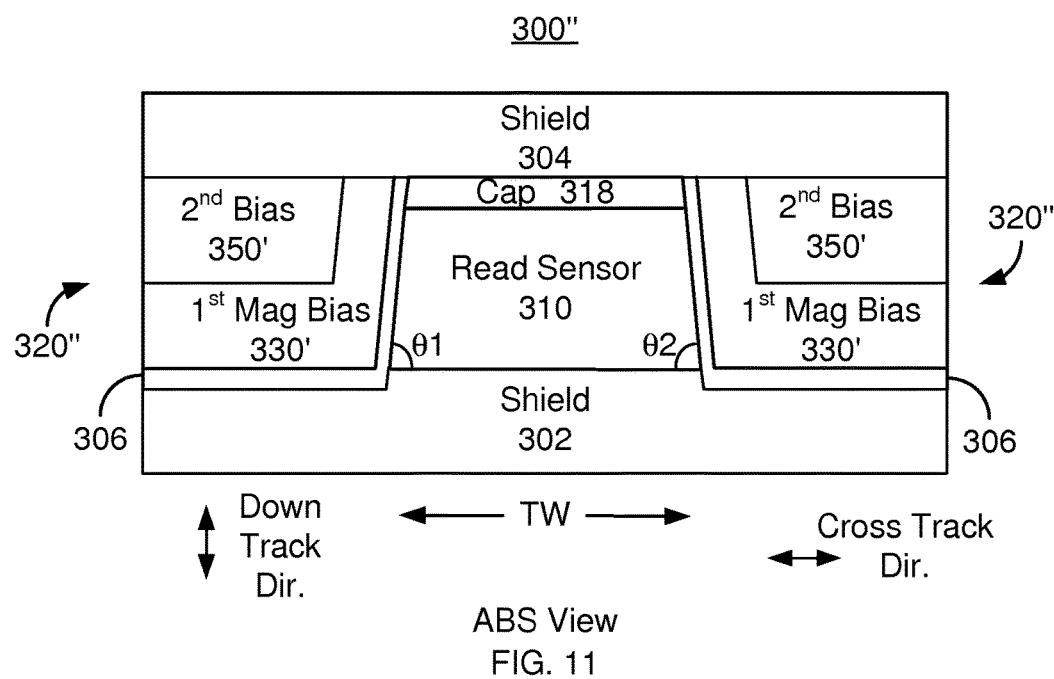
FIG. 11 depicts an ABS view of another exemplary embodiment of a portion of a magnetic recording read apparatus.

FIG. 11 depicts an ABS view of an exemplary embodiment of a read apparatus 300". For clarity, FIG. 11 is not to scale. The read apparatus 300" may be part of a read head or may be part of a merged head that also includes a write apparatus. Thus, the read apparatus 300" may be part of a disk drive having a media, a slider and the read apparatus coupled with (fabricated on) the slider. In other embodiments, the read apparatus 300" may be part of another data storage device. Further, only a portion of the components of the read apparatus 300" are depicted. The view shown in FIG. 11 may be for a read apparatus fabricated using the methods 100 and/or 110 in which the ion mills used to define the read sensor are performed at least for the cross-track direction. The head of which the read apparatus 300" is a part is part of a disk drive having a media, a slider and the head coupled with the slider. The read apparatus 300" corresponds to the read apparatus 300 and/or 300'. Consequently, analogous components are labeled similarly. The read apparatus 300" includes shields 302 and 304, read sensor 310, capping layer 318, nonmagnetic layer 306 and soft magnetic bias structures 320" that are analogous to the shields 302 and 304, read sensor 310, capping layer 318, nonmagnetic layer 306 and soft magnetic bias structures 320/320', respectively.

The magnetic bias structures 320" include magnetic bias layers 330' and 350'. In the embodiment shown, the magnetic bias layers 330' and 350' adjoin (share an interface). However, in alternate embodiments, a nonmagnetic layer analogous to the nonmagnetic layer 340 may be included. In some embodiments, the magnetic moments of the magnetic bias layers 330' and 350' are ferromagnetically aligned. One or both of the magnetic bias layers 330' and 350' include the side shielding material that has the saturation magnetization greater than 800 emu/cm$^3$ and/or the exchange length less than five nanometers. The side shielding material(s) may be selected from the material(s) described above. In some embodiments, only the magnetic layers 330' are formed of the side shielding material(s). Because a portion of the magnetic bias layers 330' are closer to the read sensor 310 than the magnetic bias layers 350', it may be preferred to use the above-described side shielding materials in at least the magnetic bias layer 330'. In other embodiments, only the magnetic layers 350' are formed of the side shielding material(s). In still other embodiments both of the magnetic layers 330' and 350' include the side shielding material(s).

The magnetic read apparatus 300" may have improved performance analogous to that of the magnetic read apparatus 200, 300 and/or 300'. The large junction angles θ1 and θ2 may allow for improved performance of the read sensor 310. Further, the high junction angle read sensor 310 may be reliably fabricated using the method 100 and/or 110. The side magnetic bias structures 320", particularly in combination with the large junction angle read sensor 310, may also provide improved side shielding. The side shielding material described above has a lower exchange length and larger magnetization than is typically selected for side shields. Thus, the improvement in the cross-track resolution for the magnetic read apparatus 300" may be considered surprising.

Figure 12:
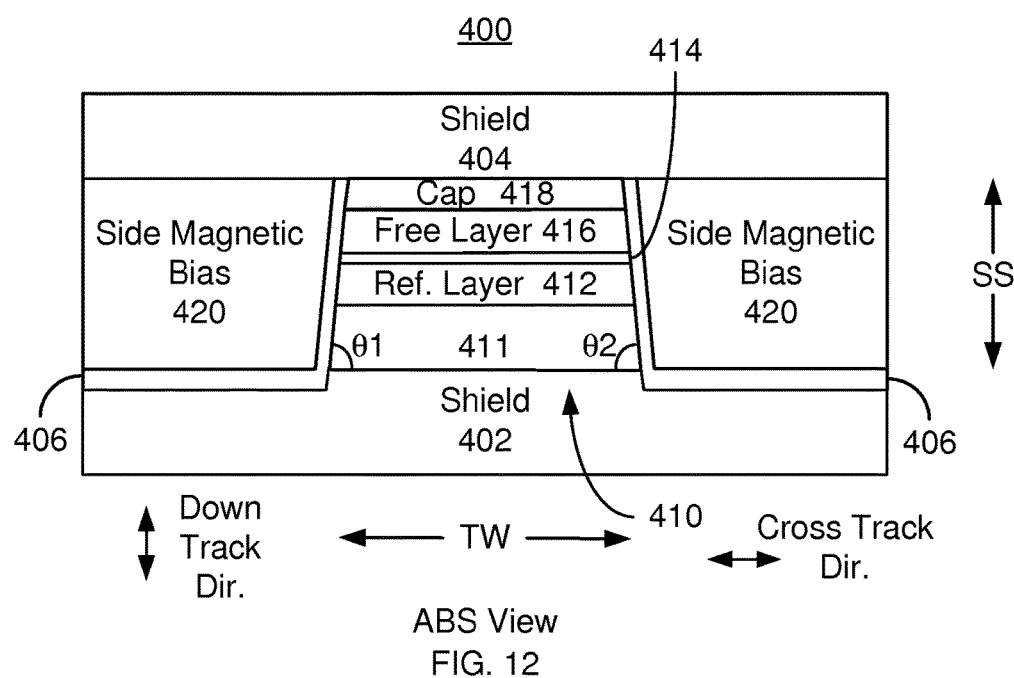
FIG. 12 depicts an ABS view of another exemplary embodiment of a portion of a magnetic recording read apparatus.

FIG. 12 depicts an ABS view of an exemplary embodiment of a read apparatus 400. For clarity, FIG. 12 is not to scale. The read apparatus 400 may be part of a read head or may be part of a merged head that also includes a write apparatus. Thus, the read apparatus 400 may be part of a disk drive having a media, a slider and the read apparatus coupled with (fabricated on) the slider. In other embodiments, the read apparatus 400 may be part of another data storage device. Further, only a portion of the components of the read apparatus 400 are depicted. The view shown in FIG. 12 may be for a read apparatus fabricated using the methods 100 and/or 110 in which the ion mills used to define the read sensor are performed at least for the cross-track direction. The head of which the read apparatus 400 is a part is part of a disk drive having a media, a slider and the head coupled with the slider. The read apparatus 400 may correspond to the read apparatuses 200, 300, 300' and/or 300". Consequently, analogous components are labeled similarly. The read apparatus 400 includes shields 402 and 404, read sensor 410, capping layer 418, nonmagnetic layer 406 and magnetic bias structures 420 that are analogous to the shields 302 and 304, read sensor 310, capping layer 318, nonmagnetic layer 306 and soft magnetic bias structures 320/320'/320", respectively.

The magnetic bias structures 420 may be monolithic, as shown in FIG. 12. Alternatively, the magnetic bias structures 420 or may include multiple layers, for example as shown in FIGS. 10 and 11. The magnetic read apparatus 400 also includes sensor 410. In the embodiment shown, the read sensor 410 includes an antiferromagnetic (AFM) layer 411, a reference layer 412 adjoining the AFM layer 411, a nonmagnetic spacer layer 414 and a free layer 416. The nonmagnetic spacer layer 414 may be a tunneling barrier layer, a conductive nonmagnetic layer or another analogous layer. The free layer 416 and reference layer 412 are magnetic and may include one or more sublayers. Similarly, the AFM layer 411 may be a multilayer or a single layer.

The magnetic read apparatus 400 may have improved performance analogous to that of the magnetic read apparatus 200, 300, 300' and/or 300". The large junction angles θ1 and θ2 may allow for improved performance of the read sensor 410. For example, the free layer 416 may have a larger volume and an attendant improvement in magnetic properties. The high junction angle read sensor 410 may be reliably fabricated using the method 100 and/or 110. The side magnetic bias structures 420, particularly in combination with the large junction angle read sensor 410, may also provide improved side shielding for the reasons discussed above. Thus, performance of the read apparatus 400 may be enhanced.

Figure 13:
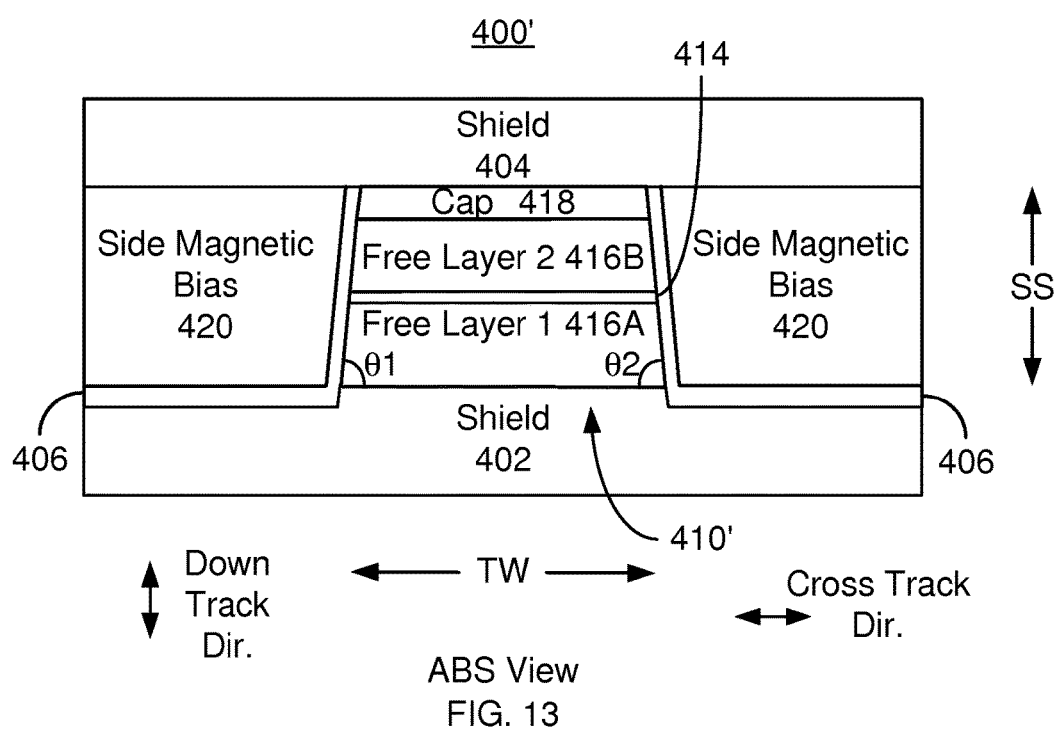
FIG. 13 depicts an ABS view of another exemplary embodiment of a portion of a magnetic recording read apparatus.

FIG. 13 depicts an ABS view of an exemplary embodiment of a read apparatus 400'. For clarity, FIG. 13 is not to scale. The read apparatus 400' may be part of a read head or may be part of a merged head that also includes a write apparatus. Thus, the read apparatus 400' may be part of a disk drive having a media, a slider and the read apparatus coupled with (fabricated on) the slider. In other embodiments, the read apparatus 400' may be part of another data storage device. Further, only a portion of the components of the read apparatus 400' are depicted. The view shown in FIG. 13 may be for a read apparatus fabricated using the methods 100 and/or 110 in which the ion mills used to define the read sensor are performed at least for the cross-track direction. The head of which the read apparatus 400' is a part is part of a disk drive having a media, a slider and the head coupled with the slider. The read apparatus 400' may correspond to the read apparatuses 200, 300, 300', 300" and/or 400. Consequently, analogous components are labeled similarly. The read apparatus 400' includes shields 402 and 404, read sensor 410', capping layer 418, nonmagnetic layer 406 and magnetic bias structures 420 that are analogous to the shields 402 and 404, read sensor 410, capping layer 418, nonmagnetic layer 406 and soft magnetic bias structures 420, respectively.

The magnetic bias structures 420 may be monolithic, as shown in FIG. 13. Alternatively, the magnetic bias structures 420 or may include multiple layers, for example as shown in FIGS. 10 and 11. The magnetic read apparatus 400' also includes sensor 410'. In the embodiment shown, the read sensor 410' is a dual free layer read sensor. Thus, the read sensor 410' includes a first free layer 416A, a nonmagnetic spacer layer 414 and a second free layer 416B. The nonmagnetic spacer layer 414 may be a tunneling barrier layer, a conductive nonmagnetic layer or another analogous layer. The free layers 416A and 416B are magnetic and may include one or more sublayers. The magnetic layers 416A and 416B may be desired to be biased in a scissor mode. Thus, the magnetic read apparatus 400' may include a rear magnetic bias structure (not shown in FIG. 13). In such an embodiment, the read sensor 410' is between the rear bias structure and the ABS. Although depicted as straight, the sidewalls for the read sensor 410' need not be. For example, the two free layers 416A and 416B may be symmetric. In such an embodiment, the middle region of the read sensor 410' may be narrower than the top or the bottom.

The magnetic read apparatus 400' may have improved performance analogous to that of the magnetic read apparatus 200, 300, 300', 300" and/or 400. The large junction angles θ1 and θ2 may allow for improved performance of the read sensor 410'. For example, the free layers 416A and 416B may have a larger volume and an attendant improvement in magnetic properties. The high junction angle read sensor 410' may be reliably fabricated using the method 100 and/or 110. The side magnetic bias structures 420, particularly in combination with the large junction angle read sensor 410', may also provide improved side shielding for the reasons discussed above. Thus, performance of the read apparatus 400' may be enhanced.

Using the methods 100 and/or 110, the apparatuses 200, 300, 300', 300", 400 and/or 400' may be fabricated. Thus, the benefits of one or more of the apparatuses 200, 300, 300', 300", 400, and/or 400' may be achieved. In particular, the formation of the read sensors and the configuration of the magnetic bias structures may improve reading and side shielding. The benefits of the methods 100 and 110 and one or more of the read apparatuses 200, 300, 300', 300", 400 and/or 400' may be attained.

What is claimed is:

1. A magnetic read apparatus having an air-bearing surface (ABS), the magnetic read apparatus comprising:
    a read sensor having a bottom, a top, and a plurality of sides, the plurality of sides forming at least one junction angle with the bottom of the read sensor, at least one junction angle being at least seventy-five degrees and not more than one hundred and five degrees, the read sensor having a track width in a cross track direction of not more than five nanometers; and
    at least one soft side magnetic bias structure adjacent to the plurality of sides of the read sensor and separated from the plurality of sides by a nonmagnetic layer, the at least one soft side magnetic bias structure comprising a side shielding material having a saturation magnetization and an exchange length, at least one of the saturation magnetization being greater than 800 emu/cm$^3$ and the exchange length being less than five nanometers, each of the at least one soft side magnetic bias structures comprising a first layer and a second layer adjoining the first layer, wherein the second layer comprises a first surface that is substantially parallel to the bottom of the read sensor and a second surface that is substantially parallel to the plurality of sides of the read sensor in a down track direction that is perpendicular to the cross-track direction, and wherein the second surface is directly between the second layer and the first layer such that the second layer is separated from the nonmagnetic layer by a portion of the first layer.

2. The magnetic read apparatus of claim 1 wherein the at least one soft side magnetic bias structure consists of the side shielding material.

3. The magnetic read apparatus of claim 1 wherein the at least one soft side magnetic bias structure comprises an additional side shielding material different from the side shielding material, the additional side shielding material having an additional saturation magnetization and an additional exchange length, at least one of the additional saturation magnetization being greater than 800 emu/cm$^3$ and the additional exchange length being less than five nanometers.

4. The magnetic read apparatus of claim 1 wherein the first layer of the at least one soft side magnetic bias structure comprises the side shielding material.

5. The magnetic read apparatus of claim 4 wherein the first layer is adjacent to the plurality of sides of the read sensor.

6. The magnetic read apparatus of claim 1 wherein the first layer and the second layer are ferromagnetically aligned.

7. The magnetic read apparatus of claim 1 wherein the first layer and the second layer are antiferromagnetically aligned.

8. The magnetic read apparatus of claim 1 wherein the second layer comprises an additional side shielding material different from the side shielding material, the additional side shielding material having an additional saturation magnetization and an additional exchange length, at least one of the additional saturation magnetization being greater than 800 emu/cm$^3$ and the additional exchange length being less than five nanometers.

9. The magnetic read apparatus of claim 1 wherein the junction angle is formed by:
    performing a first ion mill on the read sensor at a first angle and a first ion mill energy, the first angle being at least five degrees and not more than thirty degrees from a normal to the top surface of the read sensor, the first ion mill removing a portion of the read sensor such that less than half of a depth of a bottom layer of the read sensor remains unmilled; and
    performing a second ion mill at a second angle and a second ion mill energy, the second ion mill energy being less than the first ion mill energy, the second angle being greater than the first angle.

* * * * *